United States Patent [19]

Breininger

[11] Patent Number: 4,636,439

[45] Date of Patent: Jan. 13, 1987

[54] NON-GLARE COATED GLASS

[75] Inventor: J. Shannon Breininger, Gibsonia, Pa.

[73] Assignee: PPG Industries, Inc., Pittsburgh, Pa.

[21] Appl. No.: 809,644

[22] Filed: Dec. 16, 1985

Related U.S. Application Data

[63] Continuation-in-part of Ser. No. 718,755, Apr. 1, 1985, Pat. No. 4,578,100.

[51] Int. Cl.$^4$ .............................................. C03C 17/44
[52] U.S. Cl. ..................................... 428/428; 65/60.1; 65/60.8; 65/31; 65/116; 427/165; 427/167; 428/432; 134/28
[58] Field of Search ................. 65/31, 116, 60.1, 60.8, 65/60.7, 181; 427/165, 167; 134/28; 428/428, 432

[56] References Cited

U.S. PATENT DOCUMENTS

| | | | |
|---|---|---|---|
| 2,116,977 | 5/1938 | Lalse | 428/428 |
| 2,163,678 | 6/1939 | Gundlach | 428/428 |
| 2,220,862 | 11/1940 | Blodgett | 65/31 |
| 2,348,704 | 5/1944 | Adams | 65/31 |
| 3,326,715 | 6/1967 | Twells | 156/24 |
| 3,374,130 | 3/1968 | Junge et al. | 117/124 |
| 3,505,051 | 3/1970 | Buckley et al. | 65/60 |

Primary Examiner—Arthur Kellogg
Attorney, Agent, or Firm—Donna L. Seidel

[57] ABSTRACT

An alkali silicate non-glare coating is disclosed which has improved optical properties, specially resistance to haze, as a result of acid treatment which removes excess alkali from the coating.

14 Claims, No Drawings

4,636,439

NON-GLARE COATED GLASS

CROSS-REFERENCE TO RELATED APPLICATION

This application is a continuation-in-part of U.S. Ser. No. 718,755 filed Apr. 1, 1985 by the same inventor now U.S. Pat. No. 4,578,100.

BACKGROUND

This invention relates generally to the art of non-glare glass and more particularly to alkali silicate coated non-glare glass.

Some applications of glass, such as picture frames and CRT face plates, require a low-reflectance, i.e., non-glare, surface. A well-known and widely practiced method for producing such a surface is by etching the glass surface.

U.S. Pat. No. 3,374,130 to Junge et al discloses an etching solution and process for producing a non-reflective surface on glass using hydrofluoric acid.

As an alternative to acid etching the glass surface, U.S. Pat. No. 3,326,715 to Twells discloses a method for producing non-glare, low specular reflectance films on glass articles by contacting the glass surface with an aqueous solution of alkali silicate, and thereafter heating the glass at a sufficient temperature for a sufficient time to develop a durable, adherent non-glare film on the glass surface.

U.S. Pat. No. 3,505,051 to Buckley et al discloses a continuous coating process for forming a low gloss alkali silicate coating on a glass ribbon wherein the glass ribbon surface is contacted, where the temperature is preferably about 300° to 400° F., with an aqueous alkali silicate solution.

SUMMARY

The present invention provides alkali silicate coated non-glare glass with improved optical properties as result of preventing the development of haze in such coatings. The present invention involves alkali silicate non-glare coatings treated with a compound, such as an acid or salt of a weak acid, which removes excess alkali from the coating. The acid treated coatings of the present invention appears to be harder, more durable and initially clearer, as well as less susceptible to the formation of haze, compared with alkali silicate coatings which have not been treated to remove excess alkali.

DESCRIPTION OF THE PREFERRED EMBODIMENTS

The present invention involves an inexpensive, rapid and safe method for producing a non-glare surface on glass. Non-glare glass in accordance with the present invention has even lower specular reflectance than chemically etched glass, and comparable resolution. In addition, non-glare glass in accordance with the present invention has both physical and chemical durability with respect to cleaning and environmental exposure. Non-glare glass in accordance with the present invention is particularly suitable for use in picture frames as well as CRT monitor and television face plates.

Non-glare glass in accordance with the present invention is produced by first contacting a glass surface with a solution of alkali metal silicate. The alkali metal silicate may comprise sodium silicate, potassium silicate or mixtures thereof. The ratio of alkali to silicate may be varied over a wide range. The alkali silicate is preferably in aqueous solution, the concentration of which is preferably at least about 5 percent by weight. Suitable solutions are prepared by diluting commercially available alkali silicates with an appropriate amount of water. Preferred alkali silicates include KASIL potassium silicate solutions available from Philadelphia Quartz and sodium silicates available in various grades from Diamond Shamrock.

The glass surface may be contacted with the alkali silicate solution while both are at ambient temperature. Alternatively, the glass may be at an elevated temperature. In a preferred embodiment of the present invention, a continuous ribbon of float glass may be provided with a non-glare surface by contacting the glass surface before it has cooled to ambient temperature with a solution of alkali silicate. The latent heat of the glass ribbon effectively evaporates the water and sets the alkali silicate coating.

While the alkali silicate solution may be applied to the glass surface by any convenient method such as dipping, brushing or roll coating, a preferred method for applying the alkali silicate solution to the glass surface is spraying. U.S. Pat. No. 3,505,051 to Buckley, the disclosure of which is incorporated herein by reference, describes a low-gloss alkali silicate coating process for glass which is readily adaptable to the present invention. After the alkali silicate coating has been applied to the glass surface, it is necessary to treat the coated surface in accordance with the present invention in order to prevent "bloom".

It has been observed that untreated alkali silicate coatings develop a hazy appearance within about 24 hours. This hazy appearance has been referred to as "bloom", and is undesirable because it reduces the transparency of the non-glare coating. The formation of "bloom" is believed to result from the reaction of excess alkali metal in the coating with carbon dioxide in the air to form alkali metal carbonates which cause the hazy appearance. Once "bloom" occurs, it is difficult to remove and undesirable not to remove. Therefore, the prevention of "bloom" is the desired object of the present invention.

In accordance with the present invention, the alkali silicate coating is preferably treated, as soon as practical after it is formed and before any "bloom" appears, with an acid or salt of a weak acid in order to eliminate the excess alkali which causes "bloom". A preferred method for treating the alkali silicate coating is to rinse the freshly formed coating with a solution of acid. A dilute aqueous solution of acid is effective to eliminate alkali induced "bloom". Preferred acids include inorganic acids such as nitric, phosphoric, boric, sulfuric and hydrochloric acids. Organic acids, such as acetic acid, may also be used, but may require higher concentrations to be effective. Salts of weak acids, such as sodium bicarbonate, may also be employed. Nitric acid is particularly preferred in accordance with the present invention. Nitric acid is effecfive in sufficiently dilute solution that it may be added to a conventional glass washer, thus eliminating a separate step of applying the acid to the alkali silicate coating.

While acid treatment in accordance with the present invention is effective at ambient temperature, higher temperatures may be employed to compensate for lower concentrations of acid or shorter treatment cycles. Likewise, higher concentrations of acid may be employed with shorter treatment times or lower temperatures, or longer treatment times with lower temperatures or concentrations of acid. The three variables of acid concentration, temperature and time of contact with the alkali silicate coating may be varied over wide ranges and still result in effective elimination of alkali induced "bloom". For example, one particularly preferred acid treatment sequence involves contacting the alkali silicate coating with 7 percent nitric acid at ambient temperature for about 2 minutes, while another involves contacting the non-glare coating with 3.5 percent nitric acid at 110° F. (about 43° C.) for about 30 seconds.

Heat treatment of potassium silicate non-glare coatings as taught in U.S. Pat. No. 3,326,715 to Twells, the disclosure of which is incorporated herein by reference, may fortuitously prevent "bloom" of certain alkali silicate compositions. However, such heat treatment may not be practical for flat glass applications such as picture frame glass. Acid treatment in accordance with the present invention is effective to prevent "bloom" in both sodium and potassium silicate coatings, may be performed at ambient temperature, and is practicable on-line in a continuous process of coating a flat glass ribbon, as well as treating alkali-silicate non-glare coatings on bent substrates.

The present invention will be further understood from the descriptions of specific examples which follow.

EXAMPLE I

Non-glare alkali silicate coatings may be applied to individual glass plates and acid treated to prevent "bloom" as follows. In this example, a solution of sodium silicate is prepared by diluting one part by volume of a commercially available sodium silicate solution with 19 parts by volume of water. A suitable source of sodium silicate is Diamond Shamrock Grade 40, which comprises one part $Na_2O$ to 3.22 parts $SiO_2$. A sample of ⅛ inch (3 millimeters) thick clear float glass is heated at 500° F. (260° C.) for 5 minutes. A surface of the heated glass plate is then sprayed with the sodium silicate solution for 10 seconds. The air pressure to the spray gun and distance from the glass surface are adjusted so that the water in the solution evaporates on contact with the hot glass surface. After the coated glass plate has cooled, half of the sample is dipped for five minutes into an acid bath comprising one part by volume concentrated (70 percent) nitric acid and 19 parts water. Before the acid treatment, the non-glare coated surface has a luminous transmittance of 59 percent, a luminous reflectance of 5.3 percent and a gloss measurement of 23 as measured by a Gardner glossmeter. After the acid treatment, the coated surface has a luminous transmittance of 64 percent, luminous reflectance of 5.1 percent and a gloss measurement of 26. The entire coated sample, both acid treated and untreated halves, is placed in boiling water for 15 minutes. The acid treated half maintains a clear appearance with a luminous transmittance of 66 percent, luminous reflectance of 5.1 percent and gloss of 26, while the untreated half becomes hazy and grayish with a luminous transmittance of 68 percent, luminous reflectance of 6.0 percent and gloss of 34. In normal exposure to the atmosphere at ambient temperature, the untreated half will "bloom" within 24 hours, while the treated half remains clear after 7 days, which indicates that it will remain free from "bloom" indefinitely.

EXAMPLE II

An alkali silicate composition is applied continuously to a surface of a float glass ribbon to form a non-glare coating which is acid treated to prevent "bloom" as follows. A solution of potassium silicate is prepared by diluting 45 parts by volume of KASIL No. 6 with 200 parts by volume of water. KASIL No. 6, available from Philadelphia Quartz, is an aqueous solution comprising 12.5 percent $K_2O$ and 26.3 percent $SiO_2$. The alkali silicate solution is applied to the top surface of a float glass ribbon by means of spray guns reciprocating perpendicular to the direction of movement of the ribbon. In this example, clear glass with a thickness of 6 millimeters and traveling at a line speed of 200 inches (about 5 meters) per minute is contacted with the alkali silicate at a position on the line where the glass surface temperature is approximately 400° F. (204° C.). The air pressure to the spray guns and distance from the glass surface are adjusted so that the water in the solution evaporates on contact with the hot glass surface. The alkali silicate coating sets as the glass cools and moves on to a cutting station where it is cut into useful rectangular sizes. The individual coated glass plates are then immediately acid treated by contacting them for about 15 seconds with a solution of 10 percent nitric acid. The acid-treated alkali silicate coated non-glare glass products remain free from "bloom" indefinitely. In contrast, glass samples identically coated but not acid treated "bloom", i.e.; develop a white haze, in less than 24 hours.

EXAMPLE III

An alkali silicate coating is applied as in the previous example except that the substrate is a ribbon of glass nominally 3 millimeters thick, traveling at a line speed of 370 inches (9.4 meters) a minute, and the surface temperature is approximately 390° F. (199° C.) at the point where the coating composition is applied to the glass surface. The pressure in the fluid tank holding the alkali silicate solution is 5 pounds per square inch, the atomizing air pressure is 50 pounds per square inch and the spray guns are positioned approximately 10 inches (25.4 centimeters) from the glass surface. Following application of the alkali silicate coating, the glass was cut into useful sizes and treated with 10 percent nitric acid for 15 seconds as in the previous example. Again, acid-treated alkali silicate coatings remain free from "bloom" indefinitely, while untreated coatings "bloom" within 24 hours.

EXAMPLE IV

Individual glass plates are heated at 500° F. (260° C.) for 3 minutes and sprayed as in Example I with a solution comprising 62 grams of KASIL No. 6 potassium silicate solution in 100 milliliters of water to form a potassium silicate non-glare coating. Samples treated with 7 percent nitric acid for 30 seconds at ambient temperature do not develop "bloom".

EXAMPLE V

Glass plates are coated with a potassium silicate non-glare coating as in the previous example. Samples treated with 3.5 percent nitric acid for 1 minute at 110° F. (about 43° C.) do not develop "bloom".

EXAMPLE VI

Glass plates with a potassium silicate non-glare coating as in Example IV treated with 3.5 percent nitric acid for 1 minute at ambient temperature do not develop "bloom".

EXAMPLE VII

Glass plates with a potassium silicate non-glare coating as in Example IV treated with 3.5 percent nitric acid for 30 second at 110° F. (about 43° C.) do not develop "bloom".

EXAMPLE VIII

Glass plates with a potassium silicate non-glare coating as in Example IV treated with 3.5 percent nitric acid for 30 seconds at ambient temperature do not develop "bloom".

EXAMPLE IX

Glass plates with a potassium silicate non-glare coating as in Example IV treated with 3.5 percent nitric acid for 15 seconds at 110° F. (about 43° C.) do not develop "bloom". This treatment simulates addition of nitric acid to a conventional glass washer.

EXAMPLE X

Individual glass samples are heated to 500° F. (260° C.) for 5 minutes and contacted with a sodium silicate solution to form a non-glare coating as in Example I. Samples treated with 5 percent boric acid solution at room temperature for 5 minutes do not develop "bloom".

EXAMPLE XI

Glass samples coated with sodium silicate as in Example X and treated at ambient temperature for 5 minutes with 5 percent hydrochloric acid solution do not develop "bloom".

The above examples are offered to illustrate the present invention. Other acids which may be used to prevent bloom include mineral acids such as boric, phosphoric, sulfuric and hydrochloric, as well as organic acids such as acetic. In addition, aqueous solutions of salts of weak acids such as sodium bicarbonate, may be used to prevent "bloom". The composition of the acid, as well as the concentration, time and temperature of contact and so on sufficient to prevent "bloom" are variables which may be easily determined by the practitioner. The scope of the present invention is defined by the following claims.

I claim:
1. A non-glare glass article comprising:
   a. a glass substrate; and
   b. on at least one surface of said glass substrate an alkali silicate coating treated with a compound which removes excess alkali from the coating, said compound selected from the group consisting of acids and salts of weak acids.
2. An article according to claim 1, wherein said glass substrate is a continuous glass ribbon.
3. An article according to claim 1, wherein the alkali silicate coating is selected from the group consisting of sodium silicate, potassium silicate and mixtures thereof.
4. An article according to claim 1, wherein the alkali silicate coating is treated with an acid solution.
5. An article according to claim 4, wherein the coating is treated with an aqueous solution of an inorganic acid.
6. An article according to claim 5, wherein the coating is treated with a dilute aqueous solution of a mineral acid selected from the group consisting of nitric, phosphoric, boric, sulfuric and hydrochloric acids.
7. An article according to claim 6, wherein the coating is treated with a dilute aqueous solution of nitric acid.
8. An article according to claim 7, wherein the alkali silicate coating is treated with a dilute aqueous solution of nitric acid by adding nitric acid to a conventional glass washing system.
9. An article according to claim 7, wherein the coating is treated with of nitric acid solution at a concentration of about 7 percent at ambient temperature for about 2 minutes.
10. An article according to claim 7, wherein the coating is treated with nitric acid at a concentration of about 3.5 percent at a temperature of about 110° F. for about 30 seconds.
11. An article according to claim 4, wherein the coating is treated with an aqueous solution of an organic acid.
12. An article according to claim 11, wherein the organic acid is acetic acid.
13. An article according to claim 1, wherein the coating is treated with an aqueous solution of a salt of a weak acid.
14. An article according to claim 13, wherein the salt of a weak acid is sodium bicarbonate.

* * * * *